United States Patent [19]
Hokanson

[11] Patent Number: 6,094,680
[45] Date of Patent: Jul. 25, 2000

[54] SYSTEM AND METHOD FOR MANAGING DISTRIBUTED RESOURCES ON NETWORKS

[75] Inventor: Tukkar Erik Hokanson, Redmond, Wash.

[73] Assignee: Microsoft Corporation, Redmond, Wash.

[21] Appl. No.: 08/675,464

[22] Filed: Jun. 27, 1996

[51] Int. Cl.[7] .................................................. H04L 12/00
[52] U.S. Cl. ................................................. 709/223; 348/7
[58] Field of Search .......................... 395/200.53–200.56; 709/224, 229, 226, 223; 348/7

[56] References Cited

U.S. PATENT DOCUMENTS

| | | | |
|---|---|---|---|
| Re. 35,651 | 11/1997 | Bradley et al. | 348/7 |
| 4,734,765 | 3/1988 | Okada et al. | 348/107 |
| 5,132,992 | 7/1992 | Yurt et al. | 375/240 |
| 5,172,413 | 12/1992 | Bradley et al. | 380/20 |
| 5,291,554 | 3/1994 | Morales | 380/5 |
| 5,550,577 | 8/1996 | Verbiest et al. | 348/7 |
| 5,581,764 | 12/1996 | Fitzgerald et al. | 395/703 |
| 5,594,491 | 1/1997 | Hodge et al. | 348/7 |
| 5,673,430 | 9/1997 | Story | 455/4.2 |
| 5,734,719 | 3/1998 | Tsevdos et al. | 380/5 |
| 5,898,456 | 4/1999 | Wahl | 348/7 |

OTHER PUBLICATIONS

Tetzlaff et al., "A Methodology for Evaluating Storage Systems in Distributed and Hierarchical Video Servers," *Compcon Spring '94, Digest of Papers*, IEEE, pp. 430–439, Feb. 28–Mar. 4, 1994.

Guyton et al., "Locating Nearby Copies of Replicated Internet Servers", *SigComm '95*, ACM, pp. 288–298.

Singh et al., "Replica Placement in a Dynamic Network," Proceedings of the 14th International Conference on Distributed Computing Systems, IEEE, pp. 528–535.

"NETstor Hierarchical Storage Mangement Software," NETstor, Inc., Burnsville, MN 55337, p. 1.

*Primary Examiner*—William M. Treat
*Attorney, Agent, or Firm*—Lee & Hayes, PLLC

[57] ABSTRACT

A network system includes a network, multiple network cites for facilitating user access to the network, and a network manager. Each network cite has storage facilities to provide various resources to users of the network. Users can locally access certain resources at a local network cite to which they are connected, or remotely access other resources at remote network cites using the network. The network manager manages the location of resources among the network cites of the network according to a cost/availability criteria. This criteria balances allocating the resources among the network cites to make the resources available to the users against the cost associated with making the resources available to the users. Aspects of this invention are used in public network systems, entertainment network systems, online services systems, and local area network systems.

35 Claims, 5 Drawing Sheets

SYSTEM AND METHOD FOR MANAGING DISTRIBUTED RESOURCES ON NETWORKS

TECHNICAL FIELD

This invention relates to methods and systems for managing and providing resources over a network in a manner which balances availability of the resources to satisfy user demand and the cost to make the resources available.

BACKGROUND OF THE INVENTION

The quantity of information that is available in electronic form continues to grow at a rapid pace. Managing the electronic information in a manner which permits responsive distribution to users is a key design consideration in many information system architectures. This design consideration is counterweighted by an underlying requirement that the information be supplied in a cost effective manner.

There remains a challenge to provide cost-effective high-performance access to a very large quantity of information. It would be ideal if every piece of information was immediately available to each requesting user. However, this ideal is impractical. Storage costs, access costs, transaction fees, data management costs, and so on, render it implausible (if not impossible) to offer every electronic piece of data in a timely fashion.

Additionally, due to the cost of maintaining and distributing electronic information, it is imprudent to make each piece of information as equally available as the next. Generally, demand for different items of information varies significantly. This demand can change rapidly as user preferences shift. For instance, the demand for information on a hot new movie might be very high during its initial release, and then decrease dramatically in the following few weeks. As another example, market-related information is in high demand during market hours between 9:00 AM and 4:00 PM (EST), and in low demand during the other hours of the day.

The challenge of providing cost-effective high-performance access to large pools of information is particularly relevant to public networks, such as the Internet. Public networks consist of a large number of cites interconnected by a data communications network (e.g., the phone lines, cable lines, satellite, etc.). Each cite provides various quantities of resources. A university cite typically permits access to a vast amount of resources whereas a regional cite servicing rural areas might offer only limited resources. Yet, with a public network, all of these resources are made available to a user, regardless of where the resources are physically located or where the user resides.

For example, a Seattle-based user desiring information on giant pandas might use the public network to access resources maintained by the Smithsonian Institute and National Zoo in Washington, D.C. This action typically involves the user accessing the public network through a local Seattle-based network cite (e.g., an Internet Service Provider), which then traffics communication over the public network to the Smithsonian Institute. The same user might also be interested in information on the Seattle Mariners baseball team, which can be accessed locally from the Seattle-based network cite.

Access to the resources on the public network has associated costs, which may vary depending upon location and access frequency of the resources. From the perspective of the operator of the Seattle-based network cite, for example, there is a cost associated with making the resources of the Smithsonian Institute and the Seattle Mariners available to the user. These costs include charges for using the public network, number of connections allocated to users at the local cite, management fees, storage expenses for local resources, and so on.

It is therefore desirable to design a network system which meets user demand for resources by making the resources available within acceptable time frames, while satisfying the cite operators' desire to contain costs.

In database theory, there is a concept known as hierarchy storage management (or HSM) which contemplates shifting data among various storage devices of different performance levels as related to data availability to a user. The HSM system might include, for example, cache memory, RAM, disk drives, CD ROM carousel, and tape back-up. These various storage devices range from high performance/high cost (e.g., cache memory) to low performance/low cost (i.e., tape back-up). These HSM systems typically shift data among the storage hierarchy according to criteria such as access frequency wherein more frequently used data is stored on higher performance/higher cost devices, or access recency wherein more recently used data is stored on higher performance/higher cost devices. HSM systems do not, however, make any value determination that is useful to an operator who provides the data. Moreover, the HSM systems are not conveniently scaleable to large network systems, such as the Internet, where vast pools of information are widely dispersed among many cites.

SUMMARY OF THE INVENTION

This invention concerns methods and systems for managing and providing resources over a network in a manner which balances availability of the resources to meet user demand and the cost to make the resources available.

According to one aspect of this invention, a network system includes a network, multiple network cites for facilitating user access to the network, and a network manager. Each network cite has storage facilities to provide various resources to users of the network. Users can locally access certain resources at a local network cite to which they are connected, or remotely access other resources at remote network cites using the network. The network manager manages the location of resources among the network cites of the network according to a cost/availability criteria. This criteria balances allocating the resources among the network cites to make the resources available to the users given their request patterns against the cost associated with making the resources available to the users.

In one implementation, the network is a public network (i.e., Internet, USENET) and resources are distributed across the network cites to the public network. If the users at a local network cite request a particular resource that is available only from a remote network cite, the network manager weighs the cost of supplying the requested resource against the cost of supplying the same request were it offered locally. If it is cheaper to offer the resource locally (e.g., many users are requesting the same remotely located resource), then the network manager might relocate the requested resource to the local network cite where it is being requested so long as the new allocation of resources does not upset a cost/availability balance for the local network cite.

In another implementation, the network includes multiple clients supported by a cluster of servers. The network manager moves the location of the resources among the various servers within the clusters, or replicates the resources on multiple servers, in an effort to maintain the cost/availability balance.

According to another aspect of this invention, a network system has a network, multiple clients connected to the network, and a database server connected to the network to supply content to the clients. As an example, this content is video data that can be supplied from the database server to a client "on demand" over a television network or public network. The database server is configured to store the video content in a storage hierarchy in which content rated at a higher hierarchical level can be made available to comparatively more clients and content rated at a lower hierarchical level can be made available to comparatively fewer clients. This storage hierarchy might be implemented as a collection of heterogeneous storage devices having different associated performance and costs, or as a homogenous array of storage devices wherein the hierarchy is formed by replicating copies of higher rated content.

The database server is configured to manage the content within the storage hierarchy according to a cost/availability criteria. In this manner, content is optimally organized at various hierarchical levels within the storage hierarchy which facilitates acceptable availability to users, while constraining costs for keeping and supplying the content. As certain video content is requested more regularly in comparison to another content, the highly requested content might be moved to higher hierarchical level (e.g., higher performing device, or replicated) while the less requested content might be moved to lower hierarchical level (e.g., lower performing device, or removal of any additional copies) if the cost/availability criteria indicates that the system will run more effectively for user demand without increasing costs.

According to other aspects of this invention, various methods for managing resources that are available at different network cites on a public network, and for distributing content over a network from a server to multiple clients are described.

DETAILED DESCRIPTION OF THE PREFERRED EMBODIMENT

Aspects of this invention are suitable for use in a variety of networking environments. Generally, the invention pertains to methods and systems for managing, distributing, and facilitating access to resources in a network environment in a manner which balances availability of the resources in response to user demand against the cost to render the resources available. Three implementations of the invention are described in detail. A first implementation is a public network system, which is described with reference to FIGS. 1–3. A second implementation is a server cluster system in which multiple servers are interconnected to service multiple clients. The second implementation is explained with reference to FIG. 4. A third implementation concerns a server-client network system, which might be implemented as an interactive television system or an online service system. This third implementation is described with reference to FIG. 5.

Figure 1:
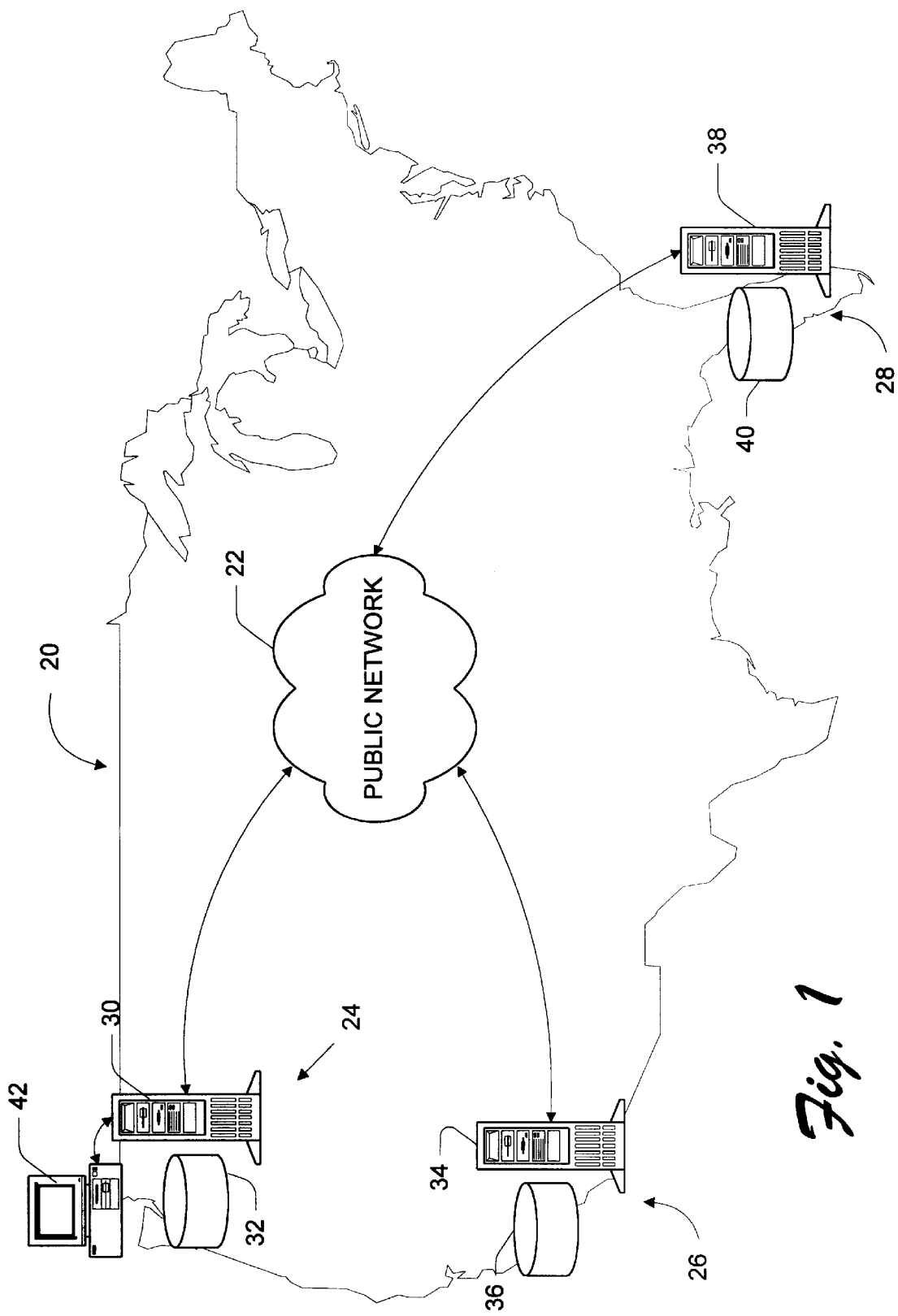
FIG. 1 is a diagrammatic illustration of a public network system constructed and operated according to an aspect of this invention.

FIG. 1 shows a public network system 20 having a network 22 and multiple network cites 24, 26, and 28 which provide access to the network 22. For discussion purposes, the public network system 20 is described within the context of servicing the United States, although it is noted that the public network 22 can be implemented on a reduced regional scale, or on an enlarged international scale. The public network 22 can be implemented in the form of a wire-based network (including telephone and cable lines), or as a wireless network (including satellite or cellular networks), or as a combination of wire-based and wireless networks. Examples of the public network 22 include the Internet and the USENET.

The three network cites 24, 26, and 28 represent connections to the public network 22 from three geographically remote locations. The first network cite 24 is located in Seattle, Wash. The second network cite 26 is located in Hollywood, Calif. The third network cite 28 is located in Miami, Fla. These three cites are merely representative of the large and growing number of network cites dispersed across the nation.

The network cites 24, 26, and 28 each service multiple users or customers by supplying various locally maintained resources as well as by facilitating access onto the public network 22. The network cites 24, 26, and 28 might be implemented, for example, as Internet Service Providers or Point of Presence servers. In the illustrated example, the Seattle-based network cite 24 is shown supporting a representative user 42, who is also located in Seattle or the surrounding area. The user has a PC (personal computer) which communicates with the network cite 24 via a modem and local telephone or cable lines. If the user desires to access information pertaining to the Seattle area, such as the roster of the Seattle Seahawks football team or minutes from a Seattle City Counsel meeting, the user can access these resources directly from the local Seattle-based network cite 24.

The Seattle user 42 can also access other resources located remotely from Seattle at other network cites on the public network. For instance, the user 42 can connect to the public network 22 via the Seattle-based network cite 24 and access information regarding recent Hollywood movies from the Hollywood-based network cite 26 or the roster of the Miami Dolphins football team from the Miami-based network cite 28.

Each network cite 24, 26, and 28 has a host computing unit, represented by servers 30, 34, and 38, and storage facilities, represented by databases 32, 36, and 40. The local storage units store the resources that are provided by the network cite. For instance, the Seattle Seahawks roster is kept on the database 32 of the Seattle-based network cite 24, while the information on Hollywood movies is kept on the database 36 of the Hollywood-based network cite 26.

The public network system 20 has a network manager to manage location of the resources among the network cites 24, 26, and 28 of the public network 22. The network manager aims to locate the resources at cites of the network to meet a cost/availability criteria prescribed for the system, or for each cite on the system. The cost/availability criteria balances the allocation of resources among the cites to make them available to the multiple users across the network while containing costs associated with making the resources available.

Providing a resource to a user has an associated cost. For locally stored resources, the cost might include an expense to store the resources on various storage devices, a retrieval cost, management fees, and a fractional bandwidth cost. This last cost—fractional bandwidth cost—concerns the proportional cost to dedicate one connection to a user which, in turn, reduces the number of available connections for other users to employ. For the remotely stored resources, the cost of providing a resource might include access cost in terms of long distant phone charges, connection fees, management fees, and so on.

These costs are weighed against making the resources available to the users according to their demand for them. In general, locally stored resources are more readily available to local users than remotely stored resources. However, resources in public network system 20 are distributed across the network at the various cites most capable of handling and managing the information. Resources from the University of Washington are best handled at the university's network cite, and resources pertaining to the Smithsonian Institute are best handled at a cite in Washington, D.C. All of these resources cannot possibly be stored locally. Consider the implausibility of storing all of the college databases, Library of Congress databases, and so on, at each local network cite. Even if technically possible, localized storage of all resources would be inefficient, exceedingly expensive, and entirely contrary to the advantages and purpose of large public networks which provide access to a limitless pool of information.

Accordingly, users might have access to some resources locally, while the large pool of resources are distributed across the many different cites on the public network. The users can only obtain the distributed resources by downloading them from other remote cites. The network manager attempts to manage resource location to satisfy the competing interests of cost and availability.

The network manager is preferably implemented in this public network embodiment as distributed software modules resident in the servers of the network cites 24, 26, and 28, as opposed to a centrally located computing device that manages the entire network. In the distributed management design, each network manager module load balances its own resources for that local network cite. This micromanagement effectively load balances the entire network system. The distributed design fits well with the large scale public network model because separate network cites are typically independently owned or independently operated in coexistence on the public network. Costs and availability factors vary considerably from cite to cite and are thus more conducive to local management. For large public networks, such as the Internet, there is essentially no place for a central controller of network traffic. On the other hand, if the network is implemented as a local area network with multiple interconnected servers assuming a role similar to the network cites, as described network server cluster implementation of FIG. 4, there might be justification for a single coordinating network manager.

Figure 2:
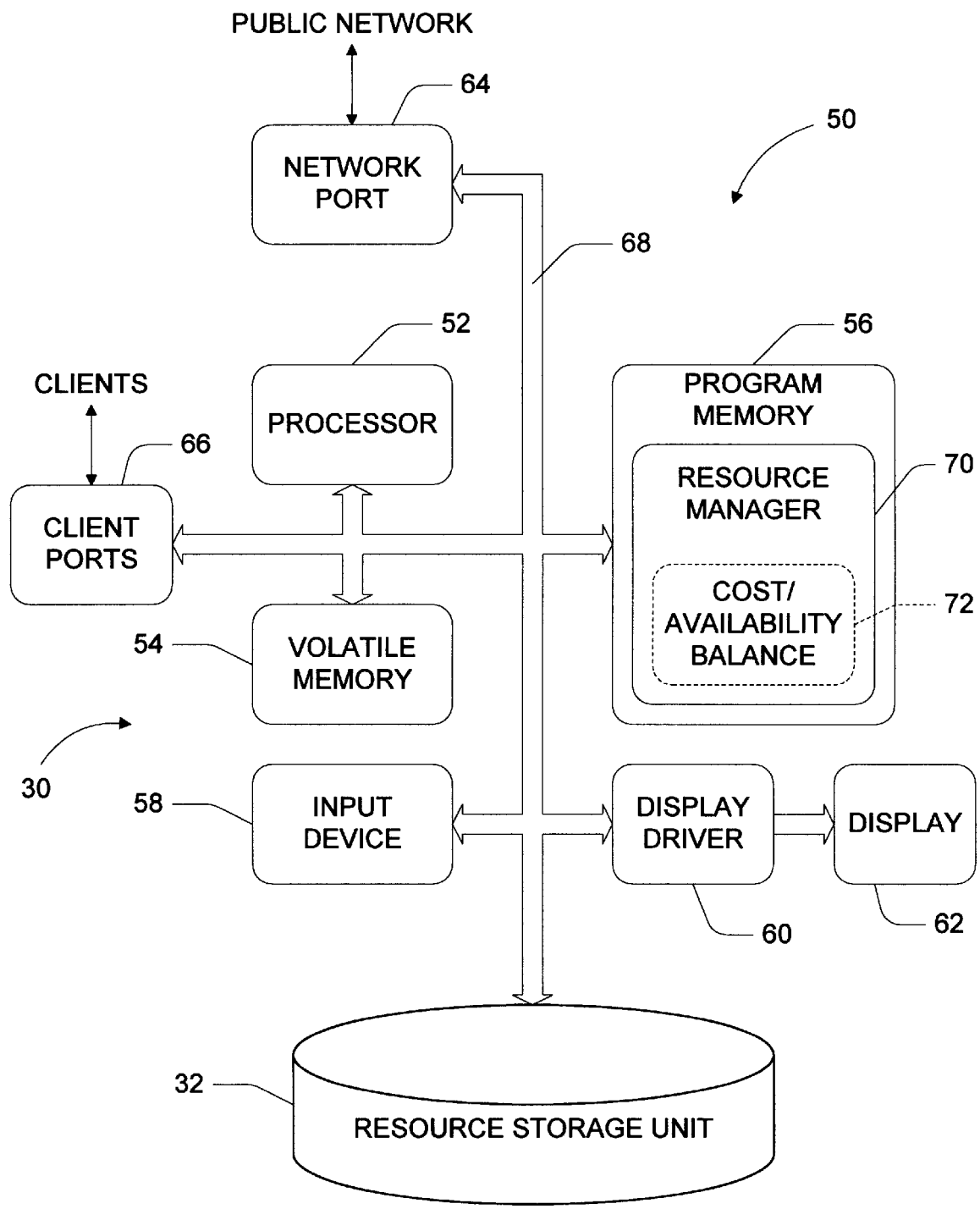
FIG. 2 is a diagrammatic illustration of a network host that is part of the FIG. 1 public network system.

FIG. 2 shows a network host computing unit 50 for the Seattle-based network cite 24. The host computing unit 50 has the server 30 and a resource storage unit 32. The server 30 includes a processor 52, a volatile memory 54 (e.g., RAM), a non-volatile program memory 56, an input device 58 (e.g., keyboard, mouse), a display driver 60 and display 62, a network port 64, and client ports 66. A data/address bus 68 interconnects these components. The client ports 66 represent the connections required to support multiple customers who use the network cite to gain access to the public network. The network port 64 represents the connections or pipeline onto the public network 22.

The resource storage unit 32 is equipped with physical storage devices (e.g., disk drives, disk arrays, CD-ROMs, tapes, etc.) and a controller to facilitate data I/O for the storage devices. The resource storage unit 32 stores the local resources provided to the clients. For the Seattle-based network cite 24, the resources might include political forums for local and county politics, web sites for local area businesses, news items for the Puget Sound, events calendar, and so on.

The host computing unit 50 has a limited storage capacity and a limited number of connections to clients and to the public network. These limited facilities have associated costs to operate them. The cost to purchase and manage the storage hardware and server computer as well as the expenses associated with connectivity to the public network all contribute to the operational costs for the network cite. These costs can be assessed to each resource on a per use basis, whereby more frequently used resources typically has a lower per use cost and less frequently used resources typically has a higher per use cost.

The network computing unit 50 is programmed with a software-implemented resource manager 70 which is stored in program memory 56 and executes on processor 52. The resource manager 70 directs the network computing unit 50 to dynamically balance the blend of resources offered by the unit and stored in storage database 32 in view of the costs to make such resources available. The resource manager 70 manages the resources according to a defined cost/availability balance 72 that is preset by the operator based upon the cite implementation (e.g., expected user traffic, number of connections to the public network, storage capacity for local storage of resources). Then, as user demand changes, the resource manager 70 dynamically adjusts the resource offerings to better service the users' requests given the finite resource capabilities of the local host computing unit, according to the cost/availability balance 72.

Figure 3:
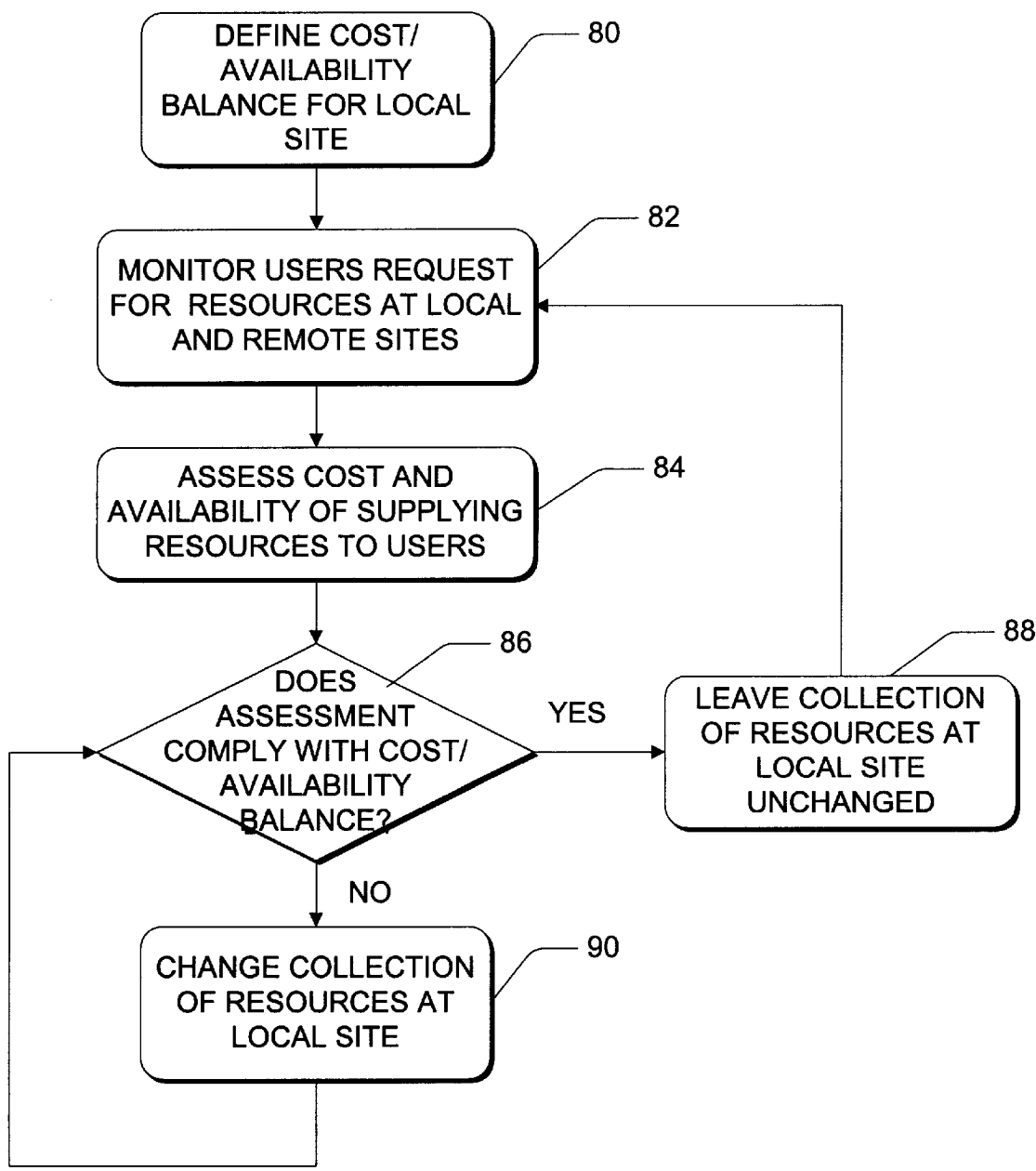
FIG. 3 is a flow diagram of a method for managing resources on the public network system.

FIG. 3 shows the steps that the resource manager 70 directs the processor 52 to perform according to one implementation. At step 80, the processor initially defines a cost/availability balance 72 which is tailored for the specific network cite. When setting up the network cite, the operator makes decisions bearing on the cost/availability balance, including how many users are to be serviced at any one time or on average, the number of resources to be stored locally, the number of data lines for user access, the pipeline bandwidth to the public network, and so. Depending upon these initial decisions, the operator then constructs a cite with servers, storage facilities, and network connections sufficient to support the expected number of users and their demand. Once the cite is constructed, the availability of resources as well as the cost to obtain them can be quantitatively deduced based upon the technological components used to implement the cite.

Once the cost/availability balance is defined, the processor monitors user requests for different resources, which may be available locally or kept at remote network cites (step 82 in FIG. 3). Over time, these requests form a pattern whereby resources range from being highly requested to being rarely or never requested. The processor assesses how available the resources are to the client and a cost associated with supplying them (step 84). Factors contributing to availability might include access time, whether the resource is locally or remotely located, and whether the user was asked to repeat the request due to unavailable client connections.

At step 86, the processor determines whether these assessed values comply with the defined cost/availability balance 72 for that local network cite. If the requests are being handled in a reasonable time frame and at an acceptable cost (i.e., indicating compliance with the cost/availability balance, or the "yes" branch from step 86), the host computing unit 50 leaves the present collection of resources at the present cite (step 88). The processor then continues its monitoring process at step 82. Conversely, if the requests are handled in an untimely fashion or at an unacceptably high cost to the operator (i.e., indicating non-compliance with the cost/availability balance, or the "no" branch from step 86), the host computing unit 50 changes the collection of resources provided at the network cite to improve availability or to lower costs (step 90). Changes are made until the network cite once again complies with the predefined cost/availability balance.

Consider the following example. Suppose that the Seattle-based network cite 24 contains a blend of resources that are tailored to users 42 in the Seattle metropolitan area. The specific composite of resources is made available so long as users are capable of accessing the resources they want in a timely manner and at an acceptable cost to the operator. Now, suppose that a hot new movie is released and the Hollywood studio sponsoring the movie posts a special notice (such as an Internet web site) at the Hollywood-based network cite 26. Many of the users 42 in the Seattle area begin requesting the movie information. Because this resource is not stored locally, the Seattle network cite 24 accesses the Hollywood-based network cite 26 to obtain the movie information. The Seattle-based network cite 24 supplies the hot new movie information to the requesting users, but at a relatively higher cost to the Seattle operator than is typically needed to supply resources that are maintained locally in Seattle.

The Seattle-based server 30 monitors the number of users requesting the movie information (step 82 in FIG. 3) and continually assesses a cost for repeatedly obtaining the movie information from the Hollywood cite 26. The resource manager 70 also monitors how readily the users are being served in their requests for the new movie information. For instance, if traffic is significantly high, some users might not even be able to access the movie information as user demand has exceeded the bandwidth afforded by the Seattle-based network cite. This has a negative appeal in terms of availability. As a result, shifting costs and availability readiness impart an imbalance to the cost/availability parameters set by the Seattle operator for the network cite.

To correct the non-compliance with the cost/availability balance (i.e., "no" branch from step 86), the resource manager 70 downloads the highly requested movie information and temporarily caches it locally at the resource storage unit 32. Any subsequent user requests for this hot movie information is thereafter handled more expediently and at less cost to the Seattle operator because the information can be accessed locally without having to connect to the public network and access the Hollywood cite 26. Caching the movie information locally effectively changes the blend of resources offered at the Seattle-based network cite (step 90), which removes the cost/availability imbalance.

On the other hand, suppose a particular user is interested in information on insects found in the Florida Everglades. To service this request, the Seattle-based network server 24 accesses information resident on the Miami-based network cite 28. As this topic is rather specialized, there are no other requests for the insect information from Seattle users. The cost for obtaining the information, albeit higher to the Seattle operator on a per use basis, does not cause an imbalance to the cost and availability elements for optimal operation. Even though downloading and caching the insect information to local storage might be less expensive than accessing the same information remotely, the process is not justified for the low user demand. Furthermore, locally caching the resource concerning the Everglades' insects might adversely make another locally stored resource less available. Thus, the resource manager does not reshuffle the resources supplied locally in Seattle.

The resource manager 70 might likewise remove or archive locally stored resources in the event that they can no longer be justified in the cost/availability criteria for the cite. The removal of resources can coincide with the addition of resources that were previously kept at remote cites. In the above example, when the movie information is cached on the local Seattle cite, one or more locally stored resources might concurrently be removed from the offerings of the cite. In this manner, resources are reshuffled and re-blended to offer different composites which satisfy shifting demand, while maintaining the cost/availability balance.

The resource manager 70 can also be used for capacity planning. During load balancing, the operator might notice that the present configuration is becoming increasingly burdened by being incapable of meeting the requests of users in a reasonable time manner, and within the acceptable cost range. The computing host might even be configured to show present per resource costs and availability times on screens depicted on display 62. The operator uses the information for making more informed business decisions concerning improving or upgrading facilities. Upgrading server performance, increasing storage capacity, or adding connections all improve resource availability to meet growing demand. There is a cost associated with such improvements; but there is also a cost attributable to user dissatisfaction in terms of fewer requests or lost customers. Accordingly, where justified from the cost/availability analysis, the operator can intelligently plan the system configuration best suited to service the population of users and then adapt as the population expands.

The resource allocation and capacity planning aspects of this invention are beneficial in markets where the operator has little knowledge of how many users will log onto a system, and what resources they will want and the performance level the demand. The operator establishes an initial computing host configuration and loads resources that the users are expected to desire. Then, during operation, the resource manager 70 will dynamically adjust the resource offering to become more tailored to the users of the cite. Moreover, as demand increases or the users want higher performance, the resource manager 70 reports factors contributing to costs and availability to the operator to assist in decisions to upgrade or improve the computing host facilities.

Figure 4:
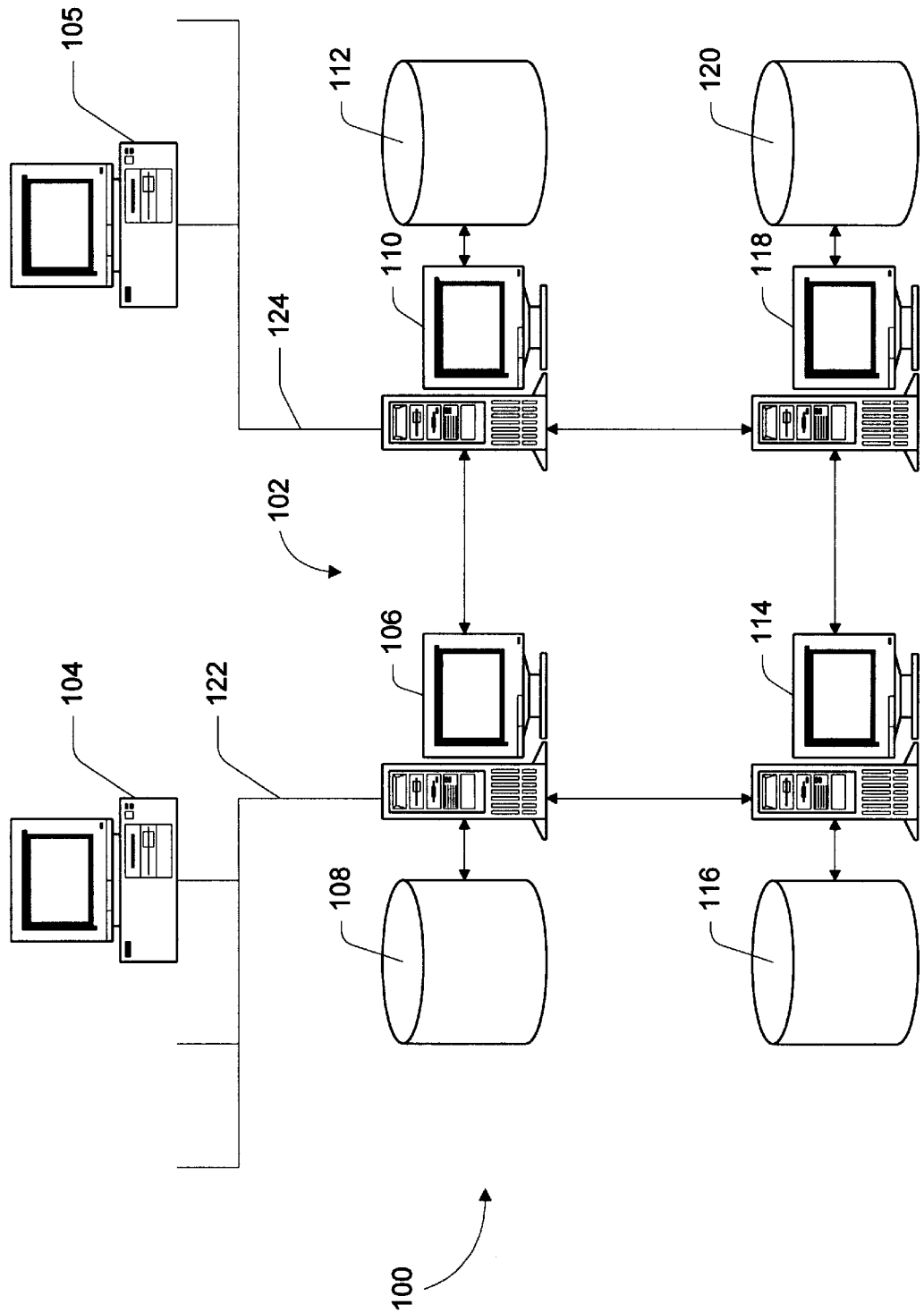
FIG. 4 is a diagrammatic illustration of a server cluster constructed and operated according to yet another aspect of this invention.

FIG. 4 shows a local network system 100 having a server cluster 102 and multiple clients 104 and 105. The server cluster 102 includes a group of interconnected servers 106, 110, 114, and 118. Each server has its own database 108, 112, 116, and 120. The clients are connected to servers in the cluster via a local area network (LAN). In the example implementation of FIG. 4, a first branch 122 of the LAN is connected to server 106 and a second branch 124 of the LAN is connected to server 110. Other branches can be connected to servers 114 and 118, although they are not shown in this illustration.

In this configuration, the clients 104 and 105 can access data on any one of the servers within the cluster 102. Client 104 is serviced by a host server 106 and client 105 is serviced by a host server 110. The clients access data on non-host servers via their host server. For instance, client 104 accesses data maintained on non-host storage devices 112, 116, and 120 (i.e., those storage devices not resident at the host server 106) via the host server 106. In general, data located on the host servers is more readily available to the clients than data located on the other non-host servers within the cluster.

In the FIG. 4 LAN configuration, the servers within the cluster are similar to the network cites described above in the public network implementation of FIG. 1. A network manager is configured to manage the location of data among the server databases 108, 112, 116, and 120 according to a cost/availability criteria. This criteria establishes a balance between how readily available the data is to the clients of the server cluster and the cost associated with making the data available. As with the public network implementation, the network manager might be implemented as distributed software modules located on each server in the cluster which each manage its own load balance. Alternatively, one server within the cluster 102 can be designated as the master with respect to this load balancing function and manage data distribution among all servers to optimize user access while reducing operation costs.

An operation similar to that of FIG. 2 is used by the network manager in the server cluster implementation of FIG. 4. Specifically, the cluster is configured and data is loaded thereon. Based upon the configuration, the network operator defines a cost/availability balance for the cluster as a whole, or more specifically for each server within the cluster (similar to step 82 in FIG. 2). The network manager monitors requests from the clients for data on the server cluster and assesses how readily available the data is and a cost associated with supplying the data to the requesting clients (akin to step 84 in FIG. 2). Based upon these assessments, the network manager dynamically manages the storage location of the data within the server cluster to maintain the defined cost/availability balance (similar to steps 86–90 in FIG. 2).

The data can be made more or less available to the clients in a number of ways. One technique is to move the data from one server to another to make it more readily available to the requesting clients. With data migration, the clients might gain quicker access to the resources as they become stored on the local host server to which the client is connected, as opposed to other servers in the cluster.

Another technique is to employ a hierarchical storage structure that is implemented as a collection of heterogeneous storage devices having different associated performance and costs. For instance, the devices might include cache is memory (high performing/high cost storage), disk drives, CD-ROMs on carousal, and tape back-up (low performance/low cost storage). The network manager moves data between the different storage hierarchies according to their cost/availability contribution. Data that requires ready availability despite the cost is stored in higher performing devices (cache, disk drives) and data that requires less availability with little expense is stored in lower performing devices (CD-ROM, tape back-up).

Another technique is to configure a storage hierarchy as a homogenous array of storage devices wherein the hierarchy is formed by the number of copies available on the system. Higher rated data is replicated at multiple servers within the cluster to make it more available an to reduce the costs associated with remotely accessing the data on a single server for each request.

Figure 5:
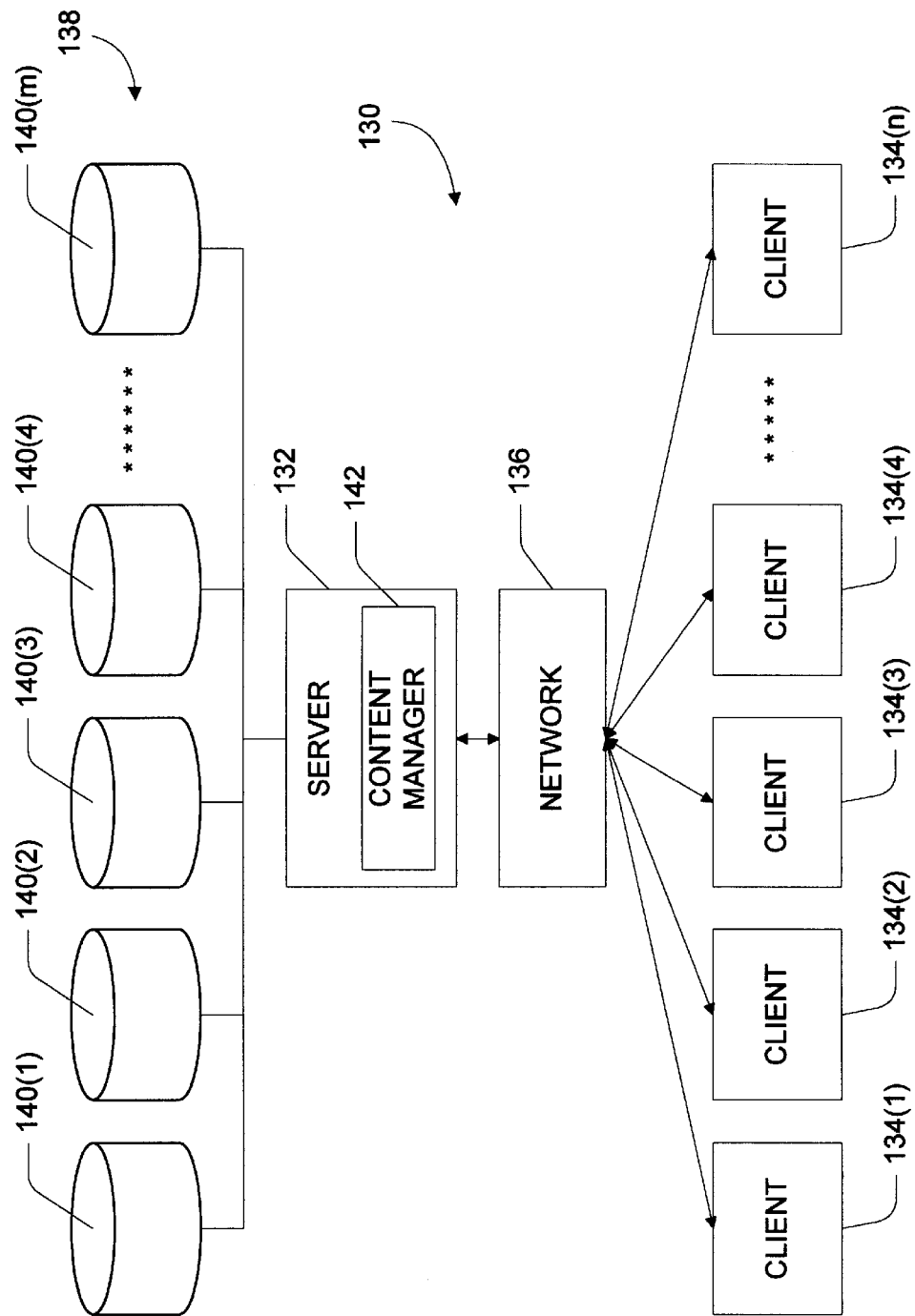
FIG. 5 is a diagrammatic illustration of a server-client network system constructed and operated according to another aspect of this invention. The FIG. 5 client-server network system is representative of an entertainment network system or an online service network system.

FIG. 5 shows a server-client network 130 having a server 132 and multiple clients 134(1), 134(2), . . . , 134(n) interconnected via a network 140. In one context, the FIG. 5 network is representative of an entertainment services network, such as an interactive television system. This is another arena where the tradeoff between high-performance and cost is at issue. Server 132 is a centralized headend configured to provide video content programs to multiple subscribers. The video content programs might include TV shows, cable programs, on-demand movies, video games, and other services. The clients 134(1)–134(n) are receiver and user interface units, such as a television and set-top box (STB).

The video signals are transmitted from the headend server 132 to the receiver and user interface units via a network 136. Current and proposed technology allows image transmission over different types of cable, RF, and satellite systems, employing both analog and digital transmission formats. As one example, the network 136 is implemented as a multi-tier structure having high-speed, high-bandwidth fiber optic cables between the headend server and regional distribution nodes, and conventional home entry lines, such as twisted-pair lines or coaxial cable, between the distribution nodes and the receiver units 134(1)–134(n). Another example is to implement the network 136 using wireless forms of communication, such as RF communication or satellite communication.

The server 132 is a continuous media server which transmits video data maintained on video storage 138. The storage 138 is implemented as a collection of independent storage devices or arrays 140(1), 140(2), . . . , 140(m) which store different program content. The database server being configured to store content in a storage hierarchy in which content rated at a higher hierarchical level can be made available to comparatively more clients and content rated at a lower hierarchical level can be made available to comparatively fewer clients. This can be accomplished through a hierarchy of different storage devices (with higher rated content being stored on higher performance storage mediums), or by replication protocols (with higher rated content being replicated multiple times).

The database server is implemented with a content manager 142 to manage the content within the storage hierarchy afforded by the devices 140(1)–140(m) according to a cost/availability criteria. The content manager 142 optimally organizes content at various hierarchical levels within the storage hierarchy to achieve a desired cost of making the content available to the clients. The content manager 142 is preferably a software-implemented module executing at the server.

As in the other network implementations of FIGS. 1 and 4, the headend operator can define a cost/availability balance which establishes a preferred balance between offering a composite of content at various hierarchical levels and a cost to supply the content within the composite at those various hierarchical levels. This balance takes into consideration the following example factors: cost of storing content, storage capacity, number of subscribers, server capabilities, subscriber viewing patterns, and distribution pipeline. Another factor that the operator might wish to consider is the licensing fee to license the video content from the studio or owner of the reproduction, distribution, and performance rights.

Consider the following example. Suppose the entertainment service operator offers a new video movie on demand that many subscribers want to view. Initially, the movie is stored at a middle hierarchical level within the video storage 138. The content manager 142 monitors the requests from the subscribers for the new movie. This is similar to step 82 in FIG. 2. The content manager 142 next assesses a present cost associated with providing the movie at its current hierarchical level (i.e., how many users can access at any one time, are there any delays in supplying the movies, cost of storage, etc.). This aspect is similar to step 84 in FIG. 2.

The content manager 142 then evaluates whether the movie should be moved within the storage hierarchy to a higher or lower hierarchical level based upon the subscribers' requests and the present cost in relation to the defined cost/availability balance. If the movie is requested by a large number of subscribers, the operator may wish to rate the move at a higher hierarchical level to make it more readily available. This can be accomplished by replicating the movie multiple times on the storage 138 to thereby render the movie more available to more subscribers. If necessary, movies that are rarely or never requested can be removed from the video storage 138 and archived in off-line storage facilities to free up space for the multiple copies of the hot new movie.

In this manner, the content manager 142 effectively tunes the video resource database to match consumer demand, without imposing undue costs. The cost/availability balance enables the content manager to make frequently requested movies more readily available at the sacrifice of rendering rarely requested movies less readily available. The continual cost/availability balance also enables the headend operator to dynamically adjust to changing consumer preferences automatically, without having to conscientiously institute program changes in response to changing demand.

The FIG. 5 network is also representative of an online services network. In this case, the server 132 is an online service provider computing host which stores content that can be downloaded to the clients or customers 134(1)–134(n). The network 136 is a phone network or cable network that provides connectivity between the online service provider 132 and the customers 134(1)–134(n). The online service provider stores content in the storage 138 and balances the content offering using the cost/availability criteria described above. As similar to the ITV headend operator, the online service provider uses the criteria to adjust the types of content provided to the users over time in response to user demand, while maintaining a reign on costs.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

I claim:

1. A method for managing resources that are available at different network sites on a public network, the network sites including a local site and at least one remote site, the local site providing locally accessible resources and the remote site providing remotely accessible resources wherein one or more users gain access to the public network through the local site to access the locally accessible resources at the local site or to access the remotely accessible resources at the remote site, the method comprising the following steps:

defining a cost/availability balance for the local site which establishes a balance between how many resources should be made available at the local site for a cost associated with making those resources available at the local site, wherein the cost/availability balance includes a consideration of local costs for locally-stored resources, and a consideration of remote costs for remotely-stored resources, and further wherein the local costs and remote costs are different;

monitoring user demand for the resources at the local site and the resources at the remote site;

assessing transaction costs associated with accessing the resources at the local and remote sites;

evaluating the user demand and the transaction costs to supply the resources requested by the user against the cost/availability balance for the local site; and changing which resources are provided at the local site to maintain the cost/availability balance defined for the local site.

2. A method as recited in claim 1 wherein the changing step comprises adding one of the resources from a remote site to the local site.

3. A method as recited in claim 1 wherein the changing step comprises removing one of the resources from the local site.

4. A method as recited in claim 1 wherein the changing step comprises the step of concurrently adding one of the resources from the remote site to the local site and removing one of the resources from the local site.

5. A computer programmed to perform the steps in the method as recited in claim 1.

6. A computer-readable memory which directs a computer to perform the steps in the method as recited in claim 1.

7. A method for distributing content over a network from a server to multiple clients, the content being stored at the server in a storage hierarchy in which content rated at a higher hierarchical level can be made available to comparatively more clients but at higher cost and content rated at a lower hierarchical level can be made available to comparatively fewer clients but at lower cost, the method comprising the following steps:

defining a cost/availability balance of supplying the content to the clients, the cost/availability balance establishing a balance between offering a composite of content at various hierarchical levels and a cost to supply the content within the composite at those various hierarchical levels, wherein the cost/availability balance takes into consideration factors that include a storage cost for storing content, a capacity factor associated with storage capacity, and a subscriber factor associated with the number of subscribers;

monitoring requests from the clients for particular content on the server;

assessing a present cost associated with providing the particular content at its current hierarchical level within the composite to the requesting clients; and evaluating whether the particular content should be moved within the storage hierarchy at the server to a higher or lower hierarchical level based upon the clients' requests and the present cost in relation to the defined cost/availability balance.

8. A method as recited in claim 7 wherein the assessing step comprises the step of assessing a present cost that includes both a cost to provide the content at its current hierarchical level and a cost for being unable to supply the content to one or more requesting clients.

9. A method as recited in claim 7 wherein the assessing step comprises the step of assessing a present cost that includes a licensing fee to license the content offered by the server.

10. A method as recited in claim 7 wherein the storage hierarchy comprises lower performing storage media for associated content rated at the lower hierarchical level and higher performing storage media for associated content rated at the higher hierarchical level, the method comprising the additional step of upgrading some of the content to the higher performing storage media and downgrading other of the content to the lower performing storage media in an effort to maintain the defined cost/availability balance.

11. A method as recited in claim 7 further comprising the step of replicating the particular content on the storage hierarchy to upgrade the particular content to a higher hierarchical level.

12. A computer programmed to perform the steps in the method as recited in claim 7.

13. A computer-readable memory which directs a computer to perform the steps in the method as recited in claim 7.

14. A method for managing data on a server cluster of interconnected servers, the data being stored in a distributed fashion among the servers of the server cluster, the service cluster servicing multiple clients, the method comprising the following steps:

defining a cost/availability balance for each server in the server cluster for supplying data to the clients, the cost/availability balance establishing a balance between how readily available the data is to the clients and a cost associated with making the data available, wherein the cost/availability balance includes a consideration of how many clients are to be serviced at any one time or on average, and the number of resources to be stored locally;

monitoring requests from the clients for the data on the server cluster;

assessing availability of the data requested by the clients;

assessing a cost associated with supplying the data requested by the clients; and managing storage location of the data among the servers within the server cluster based upon the assessed availability and cost in relation to the defined cost/availability balance.

15. A method as recited in claim 14 wherein the managing step comprises the step of replicating a particular data on different ones of the servers within the server cluster to make the particular data more readily available.

16. A network system comprising:

a network;

multiple network sites for facilitating user access to the network, individual network sites having storage to provide various resources to users of the network so that the users can locally access certain resources at a local network site and remotely access other resources at remote network sites over the network; and a network manager to manage location of the resources on the network sites of the network according to a cost/availability criteria which balances allocating the resources among the network sites to make the resources available to the users against a cost associated with making the resources available to the users, wherein the cost/availability criteria includes a consideration of local costs for locally-stored resources, and a consideration of remote costs for remotely-stored resources, wherein the local costs and remote costs can be different.

17. A network system as recited in claim 16 wherein the network comprises a public network.

18. A network system as recited in claim 16 wherein the network comprises a local area network.

19. A network system as recited in claim 16 wherein the network comprises a networked cluster of servers.

20. A network system as recited in claim 16 wherein the network manager moves at least one of the resources from one network site to another network site to balance availability and cost of providing the resources to the users.

21. A network system as recited in claim 16 wherein the network manager replicates at least one of the resources at multiple network sites to balance availability and cost of providing the resources to the users.

22. A network system as recited in claim 16 wherein:

the storage at the individual network sites comprises a hierarchical storage with higher performing storage medium and lower performing storage medium, and the network manager maneuvers the resources between the higher and lower performing storage mediums at the network sites to balance availability and cost of providing the resources to the users.

23. A network system comprising:

a network;

multiple clients connected to the network;

a database server connected to the network to supply content to the clients, the database server being configured to store content in a storage hierarchy in which content rated at a higher hierarchical level can be made available to comparatively more clients and content rated at a lower hierarchical level can be made available to comparatively fewer clients; and the database server being configured to manage the content within the storage hierarchy according to a cost/availability criteria in which the content is optimally organized at various hierarchical levels within the storage hierarchy to achieve a desired cost of making the content available to the clients, wherein the cost/availability criteria takes into account factors that include a cost of storing content, storage capacity, and a subscriber factor associated with the number of subscribers.

24. A network system as recited in claim 23 wherein the content comprises video content and the network comprises a video distribution network.

25. A network system as recited in claim 23 wherein the network comprises a public network.

26. A network system as recited in claim 23 wherein the database server replicates some of the content to balance availability and cost of providing the content to the users clients.

27. A network system as recited in claim 23 wherein:

the database server includes higher performing storage medium and lower performing storage medium, and the database server is configured to maneuver the content between the higher and lower performing storage mediums to balance availability and cost of providing the content to the clients.

28. A network host for use in facilitating access of supported clients onto a public network, the network host comprising:

a storage unit to store local resources;

a server to handle requests from clients for the local resources stored on the storage unit and for remotely located resources available from the public network, the server being configured to maintain a cost/availability balance which establishes a balance between storing a finite number of resources on the storage unit to accommodate client demand and a cost associated with locally maintaining the resources, wherein the cost/availability balance includes a consideration of costs to store content, storage capacity, and number of subscribers; and the server being further configured to retrieve and store a remotely located resource on the storage unit in an event that a cost associated with obtaining the remotely located resource from the public network exceeds a cost of locally storing the requested resource on the storage unit without disrupting the cost/availability balance.

29. A network host as recited in claim 28 wherein another resource stored on the storage unit is removed from the storage unit.

30. A network host as recited in claim 28 wherein:

the storage unit comprises a hierarchical storage system having a higher performance storage medium and a lower performance storage medium; and the server is configured to store the requested resource on the higher performance storage medium and to relocate a previous store resource from the higher performance storage medium to the lower performance storage medium.

31. A distributed content system for managing and providing content to users, comprising:

multiple storage locations having associated performance levels which enable content to be made more or less readily available to the users and associated costs for supplying the content to the users at the corresponding performance levels; and a content manager configured to manage distribution of the content among the multiple storage locations, the content manager being configured to balance availability of the content in line with demand by the users and the cost to make the content available in a manner which maintains a defined cost/availability balance that includes a consideration of a cost to store content, storage capacity, and the number of subscribers.

32. A distributed content system as recited in claim 31 wherein the multiple storage locations comprise network hosts on a public network.

33. A distributed content system as recited in claim 31 wherein the multiple storage locations comprise various types of storage media.

34. A distributed content system as recited in claim 31 wherein the multiple storage locations comprise different servers in a server cluster.

35. A distributed content system as recited in claim 31 wherein the content manager comprises a computer programmed to manage the distribution of the content among the multiple storage locations.

* * * * *

UNITED STATES PATENT AND TRADEMARK OFFICE
CERTIFICATE OF CORRECTION

PATENT NO.    : 6,094,680
DATED         : July 25, 2000
INVENTOR(S)   : Tukkar Erik Hokanson It is certified that error appears in the above-identified patent and that said Letters Patent is hereby corrected as shown below:

Title page, Item [57],
ABSTRACT,
Line 2, change "cites" to -- sites --.
Lines 3 and 5, change "cite" to -- site --.
Lines 7, 9 and 11, change "cites" to -- sites --.

Column 1,
Line 43, change "cites" to -- sites --.
Lines 45, 46, 47, 57, 62 and 66, change "cite" to -- site --.

Column 2,
Lines 4 and 9, change "cite" to -- site --.
Lines 28 and 36, change "cites" to -- sites --.
Lines 38 and 40, change "cite" to -- site --.
Lines 42, 43, 46 and 51, change "cites" to -- sites --.
Lines 52, 53, 59 and 61, change "cite" to -- site --.

Column 3,
Line 34, change "cites" to -- sites --.

Column 4,
Line 22, change "cites" to -- sites --.
Lines 24, 25, and 26, change "cite" to -- site --.
Lines 27, 28, 30 and 33, change "cites" to -- sites --.
Lines 36, 39 and 44, change "cite" to -- site --.
Line 47, change "cites" to -- sites --.
Lines 49, 51, 53, 54, 58 and 59, change "cite" to -- site --.
Lines 63 and 65, change "cites" to -- sites --.

Column 5,
Line 1, change "cite" to -- site --.
Lines 2 and 22, change "cites" to -- sites --.
Lines 24, 26 and 29, change "cite" to -- site --.
Lines 37, 39 and 44, change "cites" to -- sites --.
Line 48, change "cite" to -- site --.
Line 51, change "cites" to -- sites --.
Line 54, change "cite to cite" to -- site to site --.
Line 60, change "cites" to -- sites --.
Line 64, change "cite" to -- site --.

UNITED STATES PATENT AND TRADEMARK OFFICE
CERTIFICATE OF CORRECTION

PATENT NO. : 6,094,680
DATED : July 25, 2000
INVENTOR(S) : Tukkar Erik Hokanson

It is certified that error appears in the above-identified patent and that said Letters Patent is hereby corrected as shown below:

Column 6,
Lines 6, 14, 24 and 38, change "cite" to -- site --.
Line 49, after each occurrence of "network" change "cite" to -- site --.
Lines 55, 58 and 61, change "cite" to -- site --.
Line 64, change "cites" to -- sites --.

Column 7,
Lines 10, 15, 21, 23, 26, 34, 36, 37, 38, 46, 52, 55, 64 and 66, change "cite" to -- site --.

Column 8,
Lines 5 and 20, change "cite" to -- site --.
Line 22, change "cites" to -- sites --.
Lines 24, 26 and 56, change "cite" to -- site --.

Column 9,
Line 18, change "cites" to -- sites --.
Line 59, delete "is" after "cache".

Signed and Sealed this

Thirteenth Day of November, 2001

Attest:

*Nicholas P. Godici*

*Attesting Officer*

NICHOLAS P. GODICI
*Acting Director of the United States Patent and Trademark Office*